(12) United States Patent
Reeves

(10) Patent No.: US 7,571,819 B2
(45) Date of Patent: Aug. 11, 2009

(54) SYSTEM AND METHOD FOR STORING A DATA STORAGE DEVICE AND METHOD FOR MANUFACTURING THE SAME

(76) Inventor: John Reeves, 11349 W. 167th St., Orland Park, IL (US) 60467

( * ) Notice: Subject to any disclaimer, the term of this patent is extended or adjusted under 35 U.S.C. 154(b) by 417 days.

(21) Appl. No.: 11/344,051

(22) Filed: Jan. 31, 2006

(65) Prior Publication Data

US 2007/0175776 A1  Aug. 2, 2007

(51) Int. Cl.
*A47G 29/00* (2006.01)
*B65D 85/57* (2006.01)

(52) U.S. Cl. .................. 211/40; 206/303; 206/308.1; 211/41.12

(58) Field of Classification Search .............. 206/303, 206/308.1, 309–313, 449, 486, 490, 523, 206/562, 563; 53/452; 211/10, 41.1, 41.12
See application file for complete search history.

(56) References Cited

U.S. PATENT DOCUMENTS

| | | | |
|---|---|---|---|
| 1,303,299 A | 5/1919 | Hahl | |
| 1,420,004 A | 6/1922 | Hans | |
| 2,354,872 A | 8/1944 | Mitnick | |
| 2,864,508 A * | 12/1958 | Koncyk | 211/40 |
| 5,170,893 A * | 12/1992 | Smith | 211/40 |
| 5,215,198 A | 6/1993 | Sutton | |
| 5,289,925 A | 3/1994 | Newmark | |
| 5,542,550 A | 8/1996 | Kakavoulis et al. | |
| 5,609,258 A * | 3/1997 | Spector | 211/40 |
| 5,632,374 A * | 5/1997 | Fitzsimmons et al. | 206/308.1 |
| 6,006,899 A * | 12/1999 | McAuley et al. | 206/6.1 |
| 6,079,148 A | 6/2000 | Yonenoi | |
| 6,123,191 A * | 9/2000 | Dean | 206/310 |
| 6,457,582 B1 | 10/2002 | Chamariq et al. | |
| 6,588,604 B1 | 7/2003 | Tseng | |
| 6,626,301 B2 * | 9/2003 | de Rouvray | 211/40 |
| 6,685,034 B1 * | 2/2004 | Cooke | 211/40 |
| 6,758,346 B2 * | 7/2004 | Kollegian | 211/40 |
| 2003/0183589 A1 | 10/2003 | Kollegian | |
| 2004/0178090 A1 * | 9/2004 | Laut | 206/308.1 |
| 2005/0269216 A1 * | 12/2005 | Ovadia | 206/6.1 |

* cited by examiner

*Primary Examiner*—Luan K Bui
(74) *Attorney, Agent, or Firm*—Patents+TMS, P.C.

(57) ABSTRACT

A system and a method store a data storage device, and a method manufactures the system for storing the data storage device. The system has a base made from a foam material with a first side and a second side. The base has one or more slots and/or a hole which extend from the first side of the base through the base to the second side of the base. The data storage device is insertable into and/or is received by one of the slots of the base for storing and/or for displaying the data storage device with the base. A first edge and/or a second edge of the slot in the base abuts sides of the data storage device within the slot of the base. The first edge and/or the second edge holds, connects and/or attaches the data storage device to the slot of the base. A layer is attachable and/or is connectable to the first side of the base for receiving and/or for displaying indicia on the base. An adhesive and/or a removable liner is attachable and/or is connectable to the second side of the base for adhering, for attaching, for mounting and/or for connecting the base to a fixture.

6 Claims, 4 Drawing Sheets

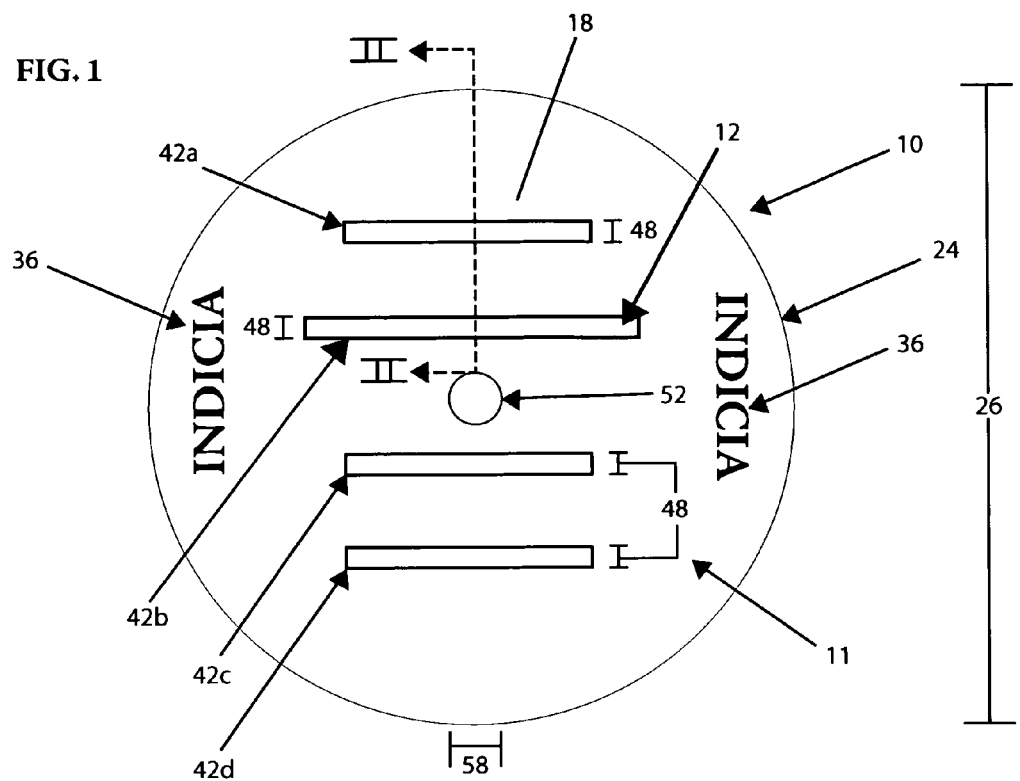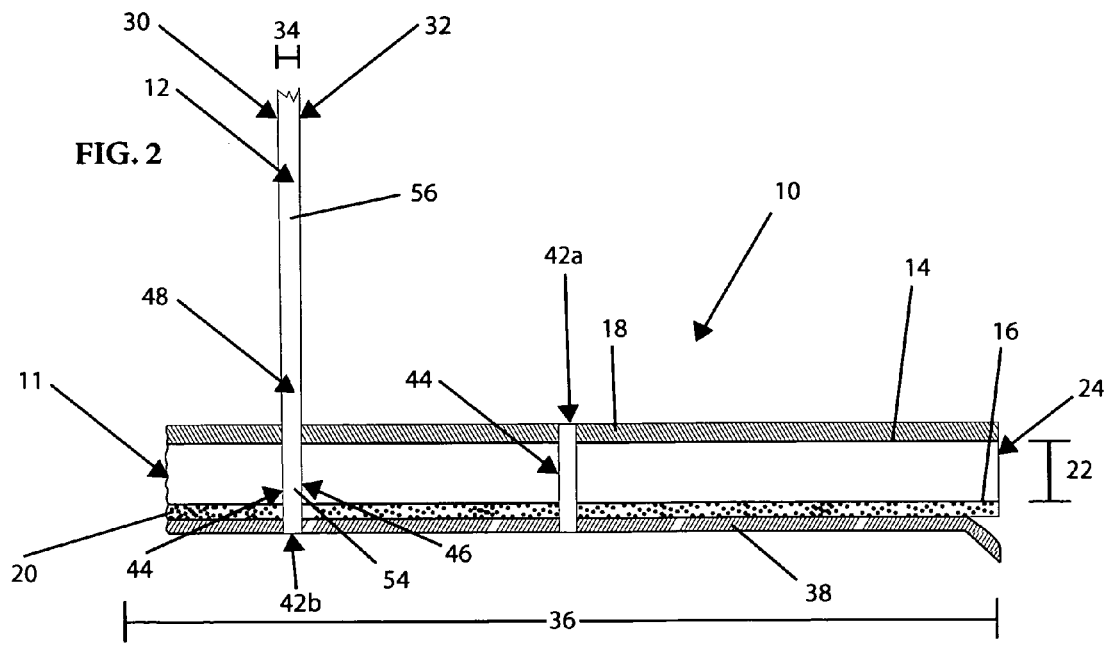

SYSTEM AND METHOD FOR STORING A DATA STORAGE DEVICE AND METHOD FOR MANUFACTURING THE SAME

BACKGROUND OF THE INVENTION

The present invention generally relates to a system and a method for storing a data storage device and a method for manufacturing the same. More specifically, the present invention relates to a system and a method for storing a data storage device and a method for manufacturing the same which may provide a base to store, to hold and/or to display the data storage device. The base may be made from a foam material having a first side and/or a second side. A first layer may be attached to, may be connected to and/or may cover the first side of the base. Indicia may be displayed on and/or may be printed onto the first layer of the base or onto the first side of the base. An adhesive layer may be attached to, may be connected to and/or may cover the second side of the base. A liner may be attachable to, may be connectable to and/or may cover the adhesive layer of the base. The base may have one or more slots extending from the first side through the base to the second side of the base. Each slot may have a first edge and a second edge which is opposite to the first edge. The data storage device may be inserted into and/or may be received by the slot between the first edge and the second edge of the slot. A force from the first edge and/or from the second edge of the slot may be exerted against and/or may be applied to sides of the data storage device. As a result, the data storage device may be connected to, may be stored between and/or may be held between the first edge and the second edge of the slot.

It is generally known that, for example, a compact disc (hereinafter "CD") and/or a digital video disk (hereinafter "DVD") is stored in a case to protect the CD and/or the DVD from scratching, from chipping and/or from damage. The case of the CD and/or of the DVD is placed, is stored and/or is organized with a rack. The rack has one or more compartments sized to receive the case of the CD and/or of the DVD for storing and/or for displaying the case of the CD and/or of the DVD. Each compartment extends from a first side of the rack to a point between the first side of the rack and a second side of the rack. Each of the compartments has an interior with a top surface, a bottom surface and/or a rear surface for receiving and/or for holding the case of the CD and/or of the DVD. The top surface, the bottom surface and the rear surface exert, apply and/or maintain a force on exterior surfaces of the case to hold, to store and/or to maintain the case inside and/or within the interior of the compartment. As a result, the case of the CD and/or of the DVD is stored, is held and/or is maintained in the interior of the compartment via the top surface, the bottom surface and/or the rear surface.

The case of the CD and/or of the DVD must be removed from the compartment of the rack to access the CD and/or the DVD. Additionally, the case of the CD and/or of the DVD must be opened to remove the CD and/or the DVD from the case for accessing and/or for utilizing the CD and/or the DVD. After the CD and/or the DVD is removed from the rack and from the compartment, the CD and/or the DVD may be inserted into an electronic device for reading, for accessing, for consuming and/or for utilizing data and/or information which is stored on the CD and/or on the DVD. Storing the CD and/or the DVD in the compartment of the rack requires the CD and/or the DVD to be stored inside and/or to be place within the case to prevent damage to the CD and/or to the DVD prior to storing the case in the interior of the compartment and/or of the shelf.

However, the CD and/or the DVD may be scratched, may be chipped and/or may be damaged by the case and/or by a user as the CD and/or the DVD is being inserted into and/or is being removed from the case. As a result, the data of the CD and/or of the DVD may be inaccessible and/or may be unreadable by the electronic device. Further, a size of the rack may be large and/or bulky and/or may not fit within a storage area for storing the CD and/or the DVD. As a result, the rack may not be used for storing the CD and/or the DVD because the size of the rack exceeds an available area of the storage area. Still further, fasteners may have to be inserted into holes of the rack for mounting, for displaying and/or for attaching the rack to a fixture, such as, for example, a wall, a shelf and/or the like. The fasteners often require use of a tool for attaching, for connecting and/or for mounting the rack to the fixture. As a result, the fastener and/or the tool may damage and/or may destroy the fixture, the rack, the CD, the DVD and/or the case during attachment of and/or mounting of the rack to the fixture.

A need, therefore, exists for a system and a method for storing a data storage device and a method for manufacturing the same. Additionally, a need exists for a system and a method for storing a data storage device and a method for manufacturing the same which may store, may display and/or may hold the data storage device in a slot of a base. Further, a need exists for a system and a method for storing a data storage device and a method for manufacturing the same which may have a slot extending from a first side through the base to a second side of the base for receiving, for displaying and/or for storing the data storage device. Still further, a need exists for a system and a method for storing a data storage device and a method for manufacturing the same which may have a first edge of a slot and a second edge of the slot formed in a base for exerting, for maintaining and/or for applying an inward force to sides of the data storage device for holding the data storage device within the slot of the base. Moreover, a need exists for a system and a method for storing a data storage device and a method for manufacturing the same which may have an adhesive attachable to a side of a base for connecting, for displaying, for mounting and/or for attaching the base to a fixture and/or to an object. Furthermore, a need exists for a system and a method for storing a data storage device and a method for manufacturing the same which may have a layer attachable to a side of a base for receiving and/or for displaying indicia and/or printed matter.

SUMMARY OF THE INVENTION

The present invention generally relates to a system and a method for storing a data storage device and a method for manufacturing the same. More specifically, the present invention relates to a system and a method for storing a data storage device and a method for manufacturing the same which may have a base with a first side and/or a second side for storing, for displaying and/or for organizing the data storage device. The base may have one or more slots which may extend from the first side through the base to the second side of the base. The data storage device may be insertable into and/or may be received by one of the slots of the base for displaying and/or for storing the data storage device with the base. Each of the slots may have a first edge and/or a second edge for receiving, for storing and/or for displaying the data storage device via the slot. The first edge and/or the second edge may exert, may maintain and/or may apply an inward force with respect to sides of the data storage device. The inward force from the first edge and/or the second edge may connect, may hold and/or may attach the data storage device to one of the slot in the base. The first side of the base may receive, may display and/or may have indicia and/or printed matter. The second side of the base may have an adhesive for attaching, for connecting, for mounting, for securing and/or for displaying the base and/or the data storage device on a fixture and/or on an object.

In an embodiment of the present invention, a system for storing a data storage device wherein the data storage device has a thickness defined between first side and a second side wherein the data storage device has a first end and a second end wherein the first end of the data storage device is opposite to the second end is provided. The system has a base having a thickness defined between a first side and a second side wherein the base has a perimeter wherein the base is made from a foam material. Moreover, the system has slots formed in the base wherein the slots extend from the first side through the base to the second side of the base wherein each of the slots is sized to receive the thickness of the data storage device wherein each of the slots has a first edge and a second edge wherein the first edge is opposite to the second edge wherein the first end of the data storage device inserts between the first edge and the second edge of one of the slots in the base wherein the first edge and the second edge abut the data storage device wherein the data storage device connects to the base via the first edge and the second edge of one of the slots wherein the second end of the data storage device extends outward with respect to the first side of the base.

In an embodiment, the foam is a polyethylene cross-linked foam.

In an embodiment, the perimeter of the base forms a geometrical shape.

In an embodiment, the system has means for displaying indicia on the base wherein the means for displaying indicia connects to the first side of the base.

In an embodiment, the system means for attaching the base to a fixture wherein the means for attaching the base connects to the second side of the base.

In an embodiment, the system has a liner removably attached to the second side of the base.

In another embodiment of the present invention, a method for storing a data storage device wherein the data store device has a thickness defined between a first side and a second side of the data storage device wherein the data storage device has a first end and a second end wherein the first end of is opposite to the second end of the data storage device is provided. The method has the step of providing a base wherein the base has a first side and a second side wherein the first side is opposite to the second side wherein the base is made from a foam material wherein the base has a slot extending from the first side through the base to the second side of the base wherein the slot has a width defined between a first edge and a second edge of the slot wherein the thickness of the data storage device is greater than the width of the slot. Moreover, the method has the step of inserting the first end of the data storage device into the slot of the base wherein the first edge of the slot applies a force inward with respect to the first side of the data storage device wherein the second edge applies a force inward with respect to the second side of the data storage device wherein the data storage device connects to the base via the first edge and the second edge of the slot in the base and further wherein the second end of the data storage device extends outward with respect to the first side of the base.

In an embodiment, the method has the step of displaying indicia on the base wherein the indicia is adjacent to the first side of the base.

In an embodiment, the method has the step of attaching a layer to the first side of the base wherein the slot is formed in the layer.

In an embodiment, the method has the step of attaching an adhesive to the second side of the base wherein the slot extends through the adhesive.

In an embodiment, the method has the step of connecting the base to an object wherein the base is displayed with the object.

In an embodiment, the method has the step of removing the data storage device from the slot of the base.

In an embodiment, the method has the step of forming a hole in the base wherein the hole extends from the first side through the base to the second side of the base wherein the hole is located at the center of the base.

In an embodiment, the method has the step of providing a projection on an object wherein the projection connects the base to the object.

In another embodiment of the present invention, a method for manufacturing a system for storing a data storage device wherein the data storage device has a first end and a second end opposite to the first end is provided. The method has the step of providing a base having a first side and a second side wherein the first side is opposite to the second side. Further, the method has the step of forming a perimeter of the base and a plurality of slots in the base wherein each of the plurality of slots extends from the first side through the base to the second side of the base wherein each of the plurality of slots has a first edge and a second edge wherein first edge is opposite to the second edge wherein each of the plurality of slots is sized to receive the first end of the data storage device wherein the data storage device connects to the base via the first edge and the second edge of one of the plurality of slots in the base. Moreover, the method has the step of displaying indicia on the base wherein the indicia is adjacent to the first side of the base.

In an embodiment, the method has the step of forming a hole in the base wherein the hole extends from the first side through the base to the second side.

In an embodiment, the method has the step of attaching a layer to the first side of the base wherein the layer displays the indicia on the base.

In an embodiment, the method has the step of attaching an adhesive layer to the second side of the base wherein the adhesive layer is made from glue, adhesive or epoxy.

In an embodiment, the method has the step of connecting a liner to the second side of the base wherein the liner is removably attached to the base.

In an embodiment, the method has the step of printing the indicia onto the top side of the base.

It is, therefore, an advantage of the present invention to provide a system and a method for storing a data storage device and a method for manufacturing the same.

Another advantage of the present invention is to provide a system and a method for storing a data storage device and a method for manufacturing the same which may have a base with one or more slots for receiving, for storing, for displaying and/or for holding the data storage device.

And, another advantage of the present invention is to provide a system and a method for storing a data storage device and a method for manufacturing the same which may have one or more slots extending through a base from a first side of the base to a second side of the base for receiving and/or for connecting to the data storage device.

Yet another advantage of the present invention is to provide a system and a method for storing a data storage device and a method for manufacturing the same which may have a layer attachable to a side of a base for receiving and/or for displaying indicia and/or printed matter.

A further advantage of the present invention is to provide a system and a method for storing a data storage device and a method for manufacturing the same which may have an adhesive attachable to a side of a base for adhering, for mounting, for attaching, for connecting and/or for displaying the base and/or the data storage device with a fixture and/or an object.

Moreover, an advantage of the present invention is to provide a system and a method for storing a data storage device and a method for manufacturing the same which may have a liner attachable to an adhesive on a base to prevent the adhesive from being exposed and/or uncovered prior to attachment to a fixture and/or to an object.

Yet another advantage of the present invention is to provide a system and a method for storing a data storage device and a method for manufacturing the same which may have a first edge and/or a second edge of a slot in a base for receiving, for displaying, for holding and/or for storing the data storage device.

Another advantage of the present invention is to provide a system and a method for storing a data storage device and a method for manufacturing the same which may have a first edge and/or a second edge in a slot of a base for exerting, for maintaining and/or for applying a force inward with respect to sides of the data storage device within the slot of the base.

Yet another advantage of the present invention is to provide a system and a method for storing a data storage device and a method for manufacturing the same which may have one or more slots and/or a hole within a base to receive indicia and/or printed matter on a side of the base.

A still further advantage of the present invention is to provide a system and a method for storing a data storage device and a method for manufacturing the same which may print and/or may display indicia and/or printed matter on a layer of the base.

Moreover, an advantage of the present invention is to provide a system and a method for storing a data storage device and a method for manufacturing the same which may receive and/or may display indicia and/or printed matter related to a corporate entity, a logo, a design and/or the like.

And, another advantage of the present invention is to provide a system and a method for storing a data storage device and a method for manufacturing the same which may have a base made from a foam material to prevent damage to the data storage device from the base.

Yet another advantage of the present invention is to provide a system and a method for storing a data storage device and a method for manufacturing the same which may have a base made from a polyethylene foam to hold, to store and/or to display the data storage device with the base.

A further advantage of the present invention is to provide a system and a method for storing a data storage device and a method for manufacturing the same which may have a base with a perimeter having a circular shape, a partial circular shape, a rectangular shape and/or a non-geometrical shape.

Moreover, an advantage of the present invention is to provide a system and a method for storing a data storage device and a method for manufacturing the same which may have a base with an opening and/or with a diameter similar to a central opening and/or a diameter of a CD and/or of a DVD.

Additional features and advantages of the present invention are described in, and will be apparent from, the detailed description of the presently preferred embodiments and from the drawings.

BRIEF DESCRIPTION OF THE DRAWINGS

FIG. 1 illustrates a top plan view of a system and a data storage device in an embodiment of the present invention.

FIG. 2 illustrates a cross sectional view taken along line II-II of FIG. 1 of the system and the data storage device in FIG. 1 in an embodiment of the present invention.

DETAILED DESCRIPTION OF THE PREFERRED EMBODIMENTS

The present invention generally relates to a system and a method for storing a data storage device and a method for manufacturing the same. The system may have a base made from a foam material with a first side and a second side. The base may have slots and/or a hole which may extend from the first side through the base to the second side of the base. The data storage device may be insertable into and/or received by one of the slots in the base for storing, for holding and/or for displaying the data storage device with the base. A first edge and/or a second edge of each of the slots in the base may exert, may maintain and/or may apply a force to sides of the data storage device within the slot of the base. As a result, the first edge and/or the second edge of each of the slots may hold, may receive and/or may maintain the data storage device within each of the slots in the base. A layer may be attachable to the first side of the base for receiving and/or for displaying indicia on the base. An adhesive and/or a removable liner may be attachable to the second side of the base for adhering, for mounting, for attaching and/or for connecting the base to an object.

Figure 3:
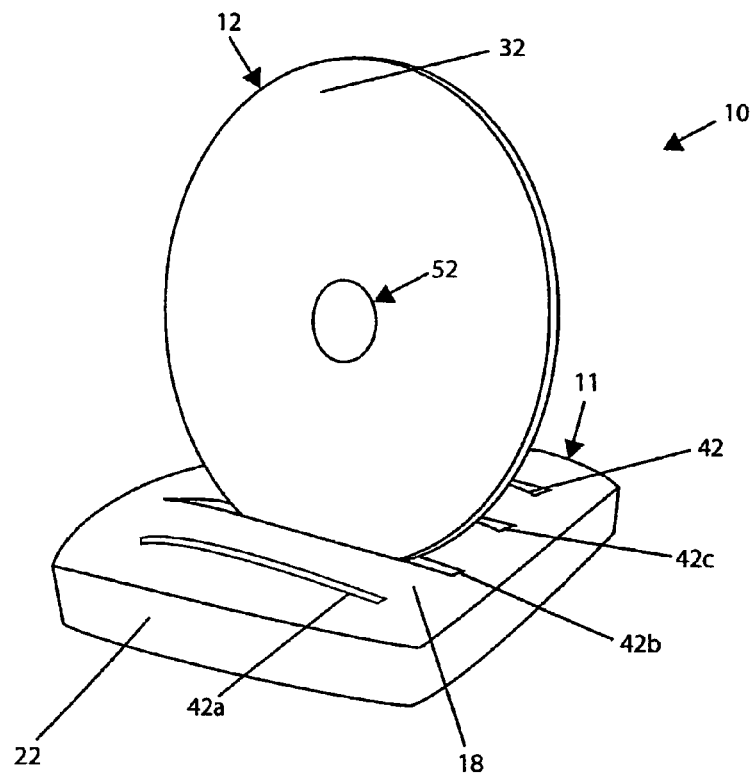
FIG. 3 illustrates a perspective view of the system and the data storage device in FIGS. 1 and 2 in an embodiment of the present invention.

Referring now to the drawings wherein like numerals refer to like parts, FIGS. 1-3 illustrate a system 10 which may store, may receive, may hold and/or may organize a data storage device 12 (hereinafter "device 12") in an embodiment of the present invention. The system 10 may have a base 11 which may have a top side 14 and/or a bottom side 16. The bottom side 16 of the base 11 is opposite to the top side 14 of the base 11. A layer 18 may be attachable to, may be connected to and/or may be adhered to the top side 14 of the system 10. An adhesive layer 20 may be attachable to, may be connected to and/or may be adhered to the bottom side 16 of the system 10. Alternatively, the bottom side 16 of the base 11 may not have and/or may not receive the adhesive layer 20.

The base 11 may be made from a material which may be rigid and/or may be resilient, such as, for example, a polyethylene cross-linked foam and/or the like. Further, the material of the base 11 may be soft to prevent damage to and/or to prevent scratching of the device 12 by the base 11. The base 11 may have a thickness 22, such as, for example, greater than three-eighths of an inch. The base 11 may be cut and/or may be formed to have a perimeter 24 and/or a diameter 26, such as, for example, approximately four and three-fourths of an inch.

The perimeter 24 of the base 11 may be formed and/or may be cut by, for example, a die-cutter and/or the like. Further, the perimeter 24 of the base 11 may be, for example, circular-shaped and/or the like. The present invention should not be deemed as limited to a specific embodiment of a shape of the perimeter 24 of the base 11. It should be understood that the material of the base 11 may be any material as known to one of ordinary skill in the art. The base 11 may be rigid, resilient and/or soft to prevent damaging and/or to prevent scratching of the device 12 by the base 11.

The device 12 may have a first side 30, a second side 32, a thickness 34, a first end 54 and/or a second end 56 as shown in FIGS. 2 and 3. The first side 30 of the device 12 is opposite with respect to the second side 32 of the device 12. Further, the first end 54 of the device 12 is opposite respect to the second end 56 of the device 12. The thickness 34 of the device 12 may be in a range between, for example, one-twentieth of an inch and five-sixteenths of an inch. The device 12 may store data and/or may store information which may be accessed by, may be consumed by, may be displayed by and/or may be utilized by an electronic device (not shown in the figures). The device 12 may be, for example, a compact disc (hereinafter "CD"), a digital video disc (hereinafter "DVD"), a zip-drive disc, a floppy disc, a CD-ROM disc, a video game cartridge, a flash memory card, a memory card, a PC card, a USB flash card and/or the like.

The layer 18 may be made from a material, such as, for example, a nylon fabric, a polyester fabric, a polyester film, a non-abrasive layer and/or the like. The layer 18 may hold, may absorb and/or may receive ink (not shown in the figures) to display indicia 36 on the top side 14 of the base 11 as shown in FIG. 1. Alternatively, the top side 14 of the base 11 may hold, may absorb and/or may receive the ink to display the indicia 36 on the top side 14 of the base 11. The present invention should not be deemed as limited to a specific embodiment of the material of the layer 18. It should be understood that the material of the layer 18 may be any material which is capable of holding, of absorbing and/or of receiving ink for displaying the indicia 36 as known to one of ordinary skill in the art.

The indicia 36 may be, for examples, numerals, logos, designs, insignias and/or words which relate to an entity, for example, advertising of a winery, brewery, a bottling company, a food processing company and/or the like. Further, the indicia 36 may be, for example, numerals, designs, insignias and/or words relating to an event such as, for example, a promotional festival, a concert tour, a celebration and/or the like. Still further, the indicia 36 may be, for example, numerals, logos, designs, insignias and/or words which relate to an advertisement, a slogan, a corporate entity, a public figure, a political figure, an athlete, an entertain, a musical group, a sports team and/or the like. It should be understood that the indicia 36 may be any indicia as known to one of ordinary skill in the art.

Figure 4:
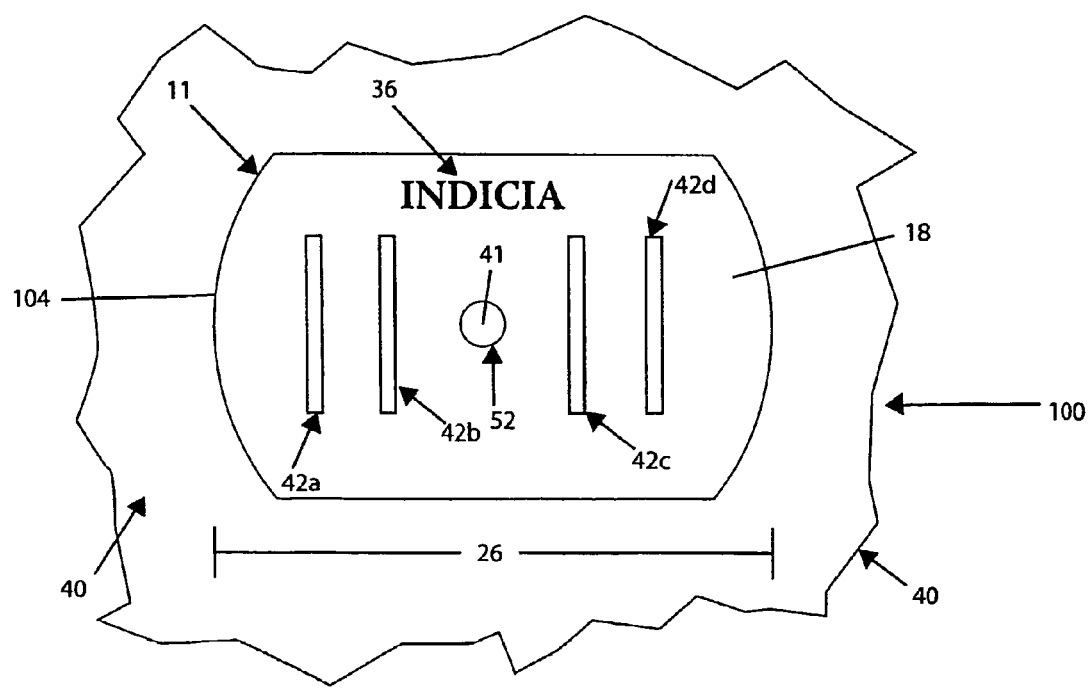
FIG. 4 illustrates a top plan view of a system for storing a data storage device in an embodiment of the present invention.
Figure 6:
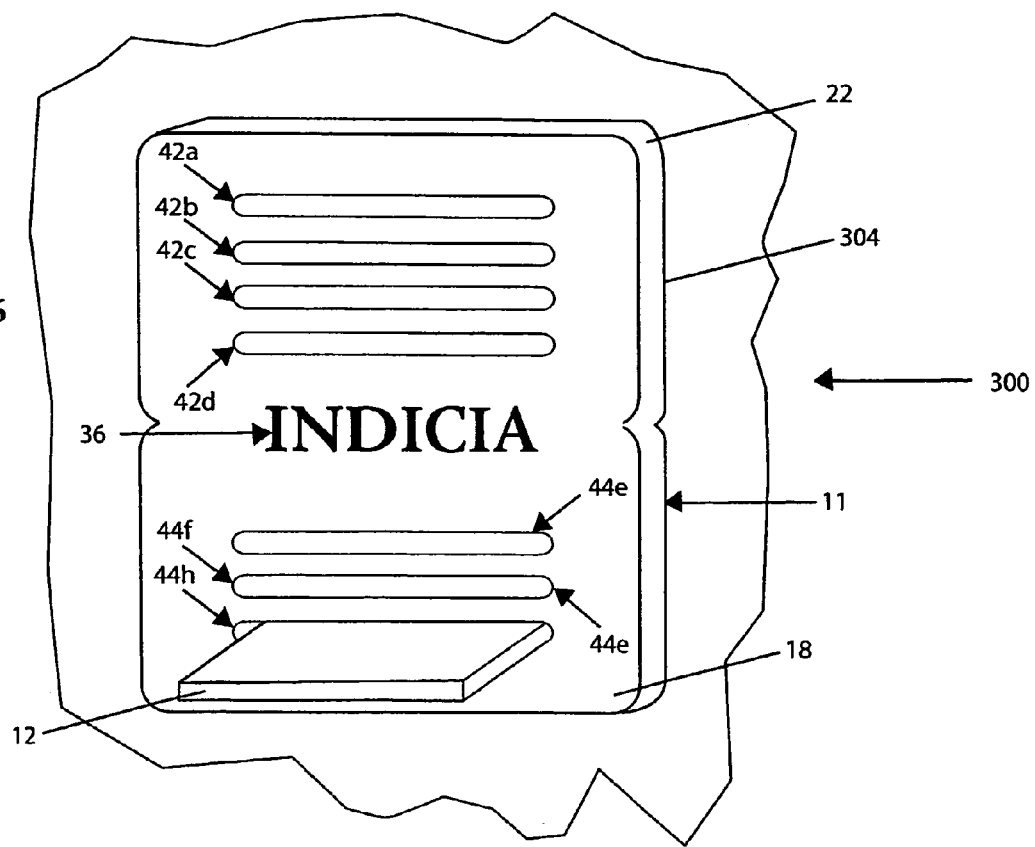
FIG. 6 illustrates a perspective view of a system and a data storage device in an embodiment of the present invention.

The adhesive layer 20 may be made from a material, such as, for example, a glue, an adhesive, an epoxy and/or the like. A liner 38 may be connectable to, may be attachable to and/or may cover the adhesive layer 20 of the base 11. The liner 38 may be, for example, a non-adhesive release liner and/or the like. The liner 38 of the base 11 may be peeled from, may be removed from and/or may be separated from the adhesive layer 20 of the base 11. As a result, the adhesive layer 20 of the base 11 may be exposed and/or may be uncovered for attaching, for mounting and/or for connecting the adhesive layer 20 of the base 11 to an object 40 (as shown in FIGS. 4 and 6). The adhesive layer 20 of the base 11 may be attachable to, may be connectable to and/or may be mountable to the object 40 for displaying the base 11 and/or the device 12. The object 40 may be, for example, a wall, a desk, a shelf, an interior surface of a folder, an exterior surface of the folder, a computer monitor, a cabinet and/or the like. Alternatively, the base 11 may not have the adhesive layer 20 and/or the liner 38 attached to the bottom side 16 of the base 11. As a result, the base 11 may be placed on a surface (not shown in the figures) of the object 40. The present invention should not be deemed as limited to a specific embodiment of the liner 38, of the material of the adhesive layer 20 and/or of the object 40.

Slots 42a-42d may be formed in the base 11 as shown in FIGS. 1-3. Alternatively, the slots 42a-42d may be cut into the base 11 by, for example, a die cutter and/or the like. The slots 42a-42d may extend through the layer 18 to the top surface 14 of the base 11. Further, the slots 42a-42d may extend from the top side 14 through the base 11 to the bottom side 16 of the base 11. Moreover, the slots 42a-42d may extend from the bottom side 16 through the adhesive layer 20 and/or through the liner 38. As a result, the slots 42a-42d may extend through the layer 18, the base 11, the adhesive layer 20 and/or the liner 38.

Each of the slots 42a-42d may be separated from the perimeter 24 by a distance of, for example, at least five-sixths of an inch. Alternatively, the slots 42a-42d may be located in a middle of the base 11 or may be centered with respect to the perimeter 24 of the base 11. Each of the slots 42a-42d may be separated from each adjacent slot by a distance of, for example, one-half inch. Each of the slots 42a-42d may not abut, may not contact and/or may not intersect another of the slots 42a-42d. Each of the slots 42a-42d may have a first edge 44 and/or a second edge 46 as shown in FIG. 2. The first edge 44 is opposite with respect to the second edge 46 of each of the slots 42a-42d. Each of the slots 42a-42d may have a width 48 between the first edge 44 and the second edge 46. The width 48 of each of the slots 42a-42f may be less than and/or may be equal to the thickness 34 of the device 12. Alternatively, the width 48 of each of the slots 42a-42d may be between a range of, for example, four one-hundredths of an inch and one-fourth of an inch. It should be understood that the base 11 may have any number of slots as known to one of ordinary skill in the art.

Each of the slots 42a-42d in the base 11 may be sized to receive the device 12 for storing, for holding and/or for receiving the device 12 with the base 11. The first end 54 of the device 12 may be insertable into one of the slots 42a-42d through the layer 18 and/or into the base 11. For example, the first end 54 of the device 12 may be insertable into the slot 42b of the base 11 as shown in FIGS. 2 and 3. The first side 30 and/or the second side 32 of the device 12 may abut, may contact and/or may be adjacent to the first edge 44 and/or the second edge 46, respectively, of the slot 42b. The first edge 44 may exert, may maintain and/or may apply a force inward with respect to the first side 30 of the device 12. The second edge 46 may exert, may maintain and/or may apply a force inward with respect to the second side 32 of the device 12. The base 11 may have a tension which may relate to, may correspond to and/or may be based on the distance between the slot 42b and the perimeter 24 of the base 11. For example, the tension in the base 11 may increase as the distance between the slot 42b and the perimeter 24 may be increased. The forces exerted inwardly from the first edge 44 and/or from the second edge 46 may correspond to and/or may relate to the tension in the base 11 at the slot 42b. The forces from the first edge 44 and/or from the second edge 46 may hold and/or may maintain the device 12 within the slot 42b. As a result, the device 12 may be removably attached to the base 11 via the forces from the first end 44 and/or from the second edge 46 of the slot 42b and/or the tension in the base 11.

The first end 54 of the device 12 may be located and/or may be positioned between the first edge 44 and the second edge 46 of the slot 42b. As a result, the device 12 may be connectable to, may be attachable to and/or may be stored in the slot 42b of the base 11 via the first edge 44 and/or the second edge 46 of the slot 42b. The second end 56 of the device 12 may extend outward with respect to the layer 18 and/or with respect to the top side 14 of the base 11. The device 12 may be removed from the slot 42b to be connectable to and/or to be insertable into the electronic device for accessing the data and/or the information stored within and/or on the device 12. It should be understood that the device 12 may be inserted into, may be connected, may be attached to and/or may be received by any one of the slots 42a-42d in the base 11.

A hole 52 may be formed in the base 11 as shown in FIG. 1. The hole 52 may be cut into base 11 by, for example, a die-cutter and/or the like. The hole 52 may extend through the layer 18 to the top surface 14 of the base 11. Further, the hole 52 may extend from the top side 14 through the base 11 to the bottom side 16 of the base 11. Moreover, the hole 52 may extend from the bottom side 16 through the adhesive layer 20 and/or through the liner 38 of the system 10. As a result, the hole 52 may extend through the layer 18, the base 11, the adhesive layer 20 and/or the liner 38. The hole 52 may have a diameter 58 of, for example, nine-sixths of an inch. The hole 52 may be centered with respect to the perimeter 24 of the base 11. It should be understood that the diameter 58 of the hole 52 may be any diameter as known to one of ordinary skill in the art.

The base 11 may be feed into and/or may be inserted into a printer (not shown in the figures) to receive the ink for displaying the indicia 36. The printer may have an arm which may be inserted into the hole 52 of the base 11 to feed, to move and/or to insert the base 11 into the printer. As a result, the base 11 may be attached to and/or may be connected to the printer via the arm of the printer and/or the hole 52 of the base 11. In an embodiment, the printer having the arm may be a disc copying or recording device and a disc label printer which is described in U.S. Pat. No. 6,760,052 and is incorporated herein by reference. The printer may apply the ink and/or may print the indicia 36 on the layer 18 and/or on the top side 14 of the base 11. Alternatively, the printer may be, for example, a compact disc printer, an inkjet printer and/or the like. The present invention should not be deemed as limited to a specific embodiment of the printer.

FIG. 4 illustrates a system 100 having the base 11 for storing, for receiving and/or for displaying the device 12 in an embodiment of the present invention. The base 11 of the system 100 may have the indicia 36 displayed on the layer 18 of the base 11. The base 11 of the system 100 may have the slots 42a-42d for receiving, for holding, for storing and/or for displaying the device 12. The base 11 of the system 100 may have the hole 52 for inserting the base into the printer to receive the indicia 36 on the layer 18 and/or on the top side 14 of the base 11. The base 11 of the system 100 may have a perimeter 104 which may have a shape, such as, for example, a partial circular shape as shown in FIG. 4. The first end 54 of the device 12 may be inserted into one of the slots 42a-42b for storing and/or for displaying the device 12 with the base 11 in the system 100. As a result, the device 12 may be attachable to, may be connectable to, may be stored with and/or may be displayed with the base 11 of the system 100 via one of the slots 42a-42d in the base 11. The base 11 may be attachable to, may be connectable to and/or may be mountable to the object 40 via the adhesive layer 20 of the base 11 in the system 100.

Alternatively, a projection 41 may be attached to, may be connected to and/or may be mounted on the object 40 as shown in FIG. 4. The projection 41 may extend outward with respect to the object 40. The projection 41 may be made from a material, such as, for example, a foam, a plastic and/or the like. The hole 52 of the base 302 may be sized to receive the projection 41 of the object 40. The projection 41 of the object 40 may be insertable in the hole 52 of the object 40. As a result, the base 302 may be attachable to, may be connectable to and/or may be mountable to the projection 41 of the object 40 via the hole 52 of the base 11 in the system 100. The present invention should not be deemed as limited to a specific embodiment of the material of the projection 41.

Figure 5:
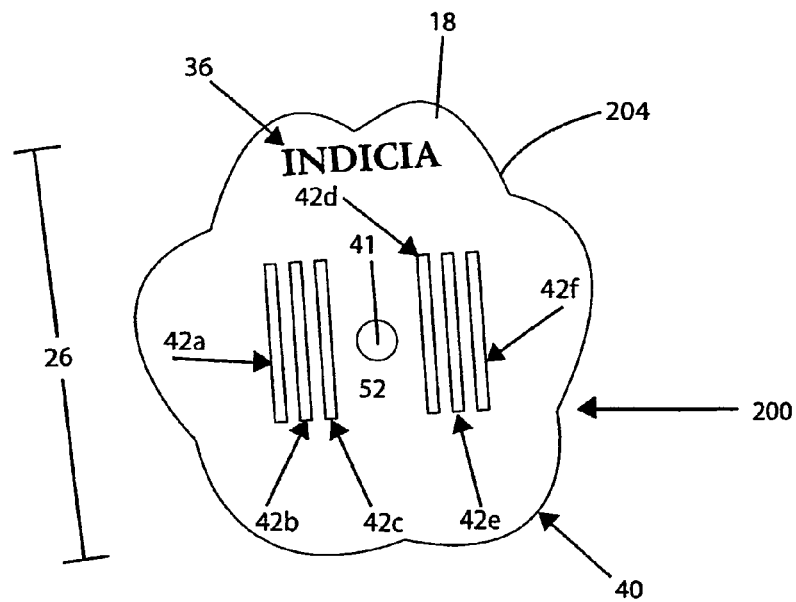
FIG. 5 illustrates a top plan view of a system for storing a data storage device in an embodiment of the present invention.

FIG. 5 illustrates a system 200 having the base 11 for storing, for receiving and/or for displaying the device 12 in an embodiment of the present invention. The base 11 in the system 200 may have the indicia 36 displayed on the layer 18 of the base 11. The base 11 in the system 200 may have slots 42a-42f for receiving, for holding, for storing and/or for displaying the device 12. The slots 42a-42f may extend through the layer 18, the base 11, the adhesive layer 20 and/or the liner 38 in the system 200. The base 11 of the system 200 may have the hole 52 for inserting the base 11 into the printer for receiving the indicia 36 on the layer 18 and/or on the top side 14 of the base 11. A perimeter 204 of the base 11 in the system 200 may be shaped as a non-geometrical shape, such as, for example, a plant, an animal, an insect, a person, a part of a body of an animal, mammal or a human, a machine, an object, a logo, a design, an emblem, an insignia, a religious symbol, a crest and/or the like. The present invention should not be limited to a specific embodiment of the non-geometrical shape of the perimeter 204 of the base 11. It should be understood that the non-geometrical shape of the perimeter 204 may be any non-geometrical shape as known to one of ordinary skill in the art.

The first end 54 of the device 12 may be inserted into one of the slots 42a-42f for storing and/or for displaying the device 12 with the base 11 in the system 200. As a result, the device 12 may be attachable to, may be connectable to, may be stored with and/or may be displayed with the base 11 in the system 200 via one of the slots 42a-42f in the base 11. The base 11 may be attachable to, may be connectable to and/or may be mountable to the object 40 via the adhesive layer 20 of the base 11 in the system 200. Alternatively, the base 11 may be attachable to, may be connectable to and/or may be mountable to the object 40 via the projection 41 of the object 40 and/or the hole 52 of the base 11 in the system 200.

FIG. 6 illustrates a system 300 having the base 11 for storing, for receiving and/or for displaying the device 12 in an embodiment of the present invention. The base 11 in the system 300 may have the indicia 36 displayed on the layer 18 of the base 11. The base 11 of the system 300 may have slots 42a-42h for receiving, for holding, for storing and/or for displaying the device 12. The slots 42a-42h may extend through the layer 18, the base 11, the adhesive layer 20 and/or the liner 38 of the system 300. A perimeter 304 of the base 11 in the system 300 may have a geometrical shape, such as, for example, a square, a rectangle, an oval, a circle, a semi-circle, a triangle and/or the like. The present invention should not be limited to a specific embodiment of the geometrical shape of the perimeter 304 of the base 11. It should be understood that the geometrical shape of the perimeter 304 may be any geometrical shape as known to one of ordinary skill in the art.

Figure 7:
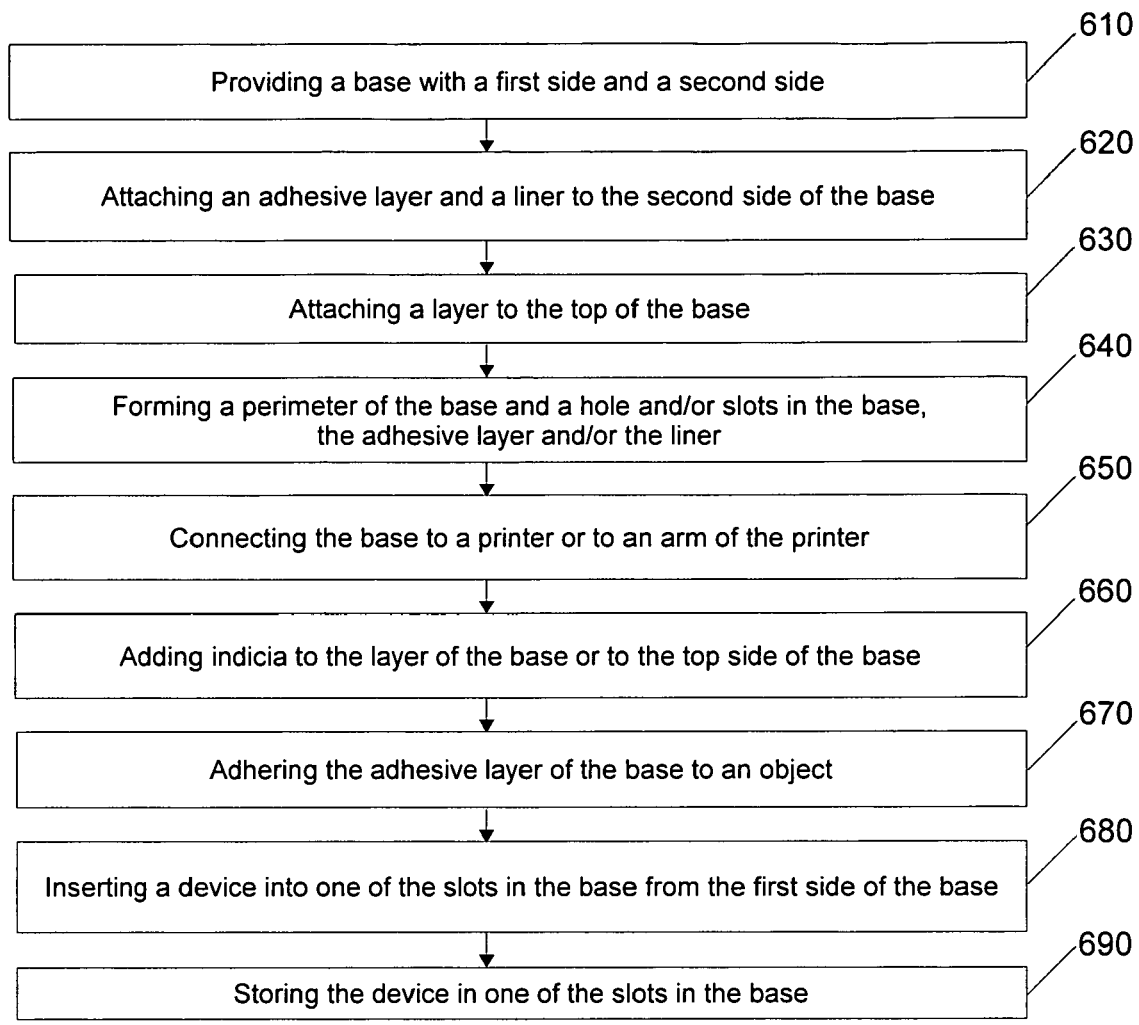
FIG. 7 illustrates a flowchart of a method for manufacturing a system and/or for storing a data storage device in an embodiment of the present invention.

FIG. 7 illustrates a method 600 for manufacturing the base 11 and for using the base 11 to store the device 12. The method 600 may have the step of providing the base 11 with the first side 14 and the second side 16 as shown at step 610. The adhesive layer 20 and/or the liner 38 may be connected to, may be attached to and/or may be adjacent to the second side 16 of the base 11 as shown at step 620. The adhesive layer 20 may be located between the liner 38 and the second side 16 of the base 11. As a result, the liner 38 may prevent the adhesive layer 20 from being exposed and/or from being uncovered. The layer 18 may be connected to, may be attached to and/or may be adjacent to the top side 14 of the base 11 as shown at step 630. As a result, the layer 18 may cover the first side 14 of the base 11. The perimeter 24, the hole 52 and/or the slots 42a-42d may be formed in the base 11, the layer 18, the adhesive layer 20 and/or the liner 38 as shown at step 640. Further, the perimeter 24, the hole 52 and/or the slots 42a-42d may be cut into the base via a cutting device, such as, for example, the die-cutter and/or the like. Alternatively, the base 11, the layer 18, the adhesive layer 20 and/or the liner 38 may be preformed and/or integrally formed with the perimeter 24, the hole 52 and/or the slots 42a-42d. It should be understood that the cutting device may be any cutting device as known to one of ordinary skill in the art.

The base 11 may be connected to and/or may be insertable into the printer for adding and/or for printing the indicia 36 on the layer 18 or the top side 14 of the base 11 as shown at step 650. The base 11 may be inserted into the printer or may be positioned in a compartment of the printer for receiving the indicia 36 from the printer. The base may be attached to the arm of the printer via the hole 52 for receiving the indicia 36 from the printer as shown at step 650. The indicia 36 may be printed onto and/or may be added to the layer 18 or to the top side 14 of the base 11 via the printer as shown at step 660. Alternatively, the indicia may be added to the layer 18 or to the top side 14 of the base 11 via an imaging process, such as, for example, silk-screening process, a labeling process and/or the like. The base 11 may be removed from and/or may be separated from the printer for receiving, for storing and/or for displaying the device 12. It should be understood that the imaging process for the indicia 36 may be any imaging process as known to one of ordinary skill in the art.

The liner 38 may be removed, may be peeled away from and/or may be separated from the adhesive layer 20 of the base 11. The adhesive layer 20 of the base 11 may be adhered to the object 40 for displaying and/or for storing the device 12 with the object 40 as shown at step 670. Alternatively, the base 11 may not be adhered to the object 40 and/or may be placed on the surface of the object 40. In another embodiment, the projection 41 of the object 40 may be inserted in and/or may be received by the hole 52 of the base 11 for displaying and/or for storing the device 12 with the object 40. The device 12 may be inserted into and/or may be received by one of the slots 42a-42d, such as, for example, the slot 42b in the base 11 as shown at Step 680. The device 12 may be located between and/or may be positioned between the first edge 44 and/or the second edge 46 of the slot 42b in the base 11. The device 12 may be connectable to and/or may be attachable to the base 11 via the first edge 44 and/or the second edge of the slot 42b in the base 11. As a result, the device 12 may be displayed with and/or may be stored with the base 11 via the slot 42b as shown at step 690.

It should be understood that various changes and modifications to the presently preferred embodiments described herein will be apparent to those skilled in the art. Such changes and modifications may be made without departing from the spirit and scope of the present invention and without diminishing its attendant advantages. It is, therefore, intended that such changes and modifications be covered by the appended claims.

I claim:

1. A system for storing a plurality of data storage devices on a surface, the system comprising:
   a base having a thickness defined between a first side and a second side wherein the second side of the base is positioned opposite to the first side of the base wherein the base has a perimeter wherein the base is made from a polyethylene cross-linked foam;
   a first layer adhered to the first side of the base wherein the first layer is constructed from a non-abrasive fabric wherein the non-abrasive fabric is constructed from one of the group consisting of polyester and nylon; and
   a plurality of slots formed in the first layer and the base wherein each of the plurality of slots extends through the first layer and from the first side of the base through the base to the second side of the base in a direction generally perpendicular to the first side of the base and the second side of the base wherein each of the plurality of slots is positioned a distance from an adjacent one of the plurality of slots wherein the distance is at least one-half of an inch wherein each of the plurality of slots has a width defined between a first edge and a second edge wherein the first edge is opposite to the second edge wherein the foam maintains a tension in the base wherein the first edge exerts a first force inward with respect to the second edge along the entire thickness of the base wherein the second edge exerts a second force inward with respect to the first edge along the entire thickness of the base wherein the first force and the second force are related to the tension in the base; and
   a second layer on the second side of the base wherein the second layer is an adhesive to attach the base to the surface wherein each of the plurality of slots extends from the second side of the base through the second layer.

2. The system of claim 1 wherein the thickness of the base is greater than three-eights of an inch.

3. The system of claim 1 wherein the perimeter of the base forms a geometrical shape.

4. The system of claim 1 further comprising:
   a hole extending entirely through the first layer, the base and the second layer to position the base on the surface wherein the hole is centered with respect to the perimeter of the base.

5. The system of claim 1 further comprising:
   indicia on the first layer.

6. The system of claim 1 further comprising:
   a liner removably attached to the second layer wherein each of the plurality of slots extend from the second layer of the base through the liner.

* * * * *